(12) United States Patent
Li et al.

(10) Patent No.: US 8,911,599 B2
(45) Date of Patent: Dec. 16, 2014

(54) TOOL ADAPTER ASSEMBLY AND MACHINING SYSTEM

(75) Inventors: Hongtao Li, Shanghai (CN); Bin Wei, Mechanicville, NY (US); Xiaobin Chen, Shanghai (CN); Steven Robert Hayashi, Niskayuna, NY (US); Renwei Yuan, Shanghai (CN); Yuanfeng Luo, Shanghai (CN)

(73) Assignee: General Electric Company, Schenecady, NY (US)

( * ) Notice: Subject to any disclaimer, the term of this patent is extended or adjusted under 35 U.S.C. 154(b) by 0 days.

(21) Appl. No.: 13/574,345

(22) PCT Filed: Jan. 20, 2011

(86) PCT No.: PCT/US2011/021833
§ 371 (c)(1),
(2), (4) Date: Jul. 20, 2012

(87) PCT Pub. No.: WO2011/091119
PCT Pub. Date: Jul. 28, 2011

(65) Prior Publication Data
US 2012/0285820 A1    Nov. 15, 2012

(30) Foreign Application Priority Data

Jan. 22, 2010  (CN) .......................... 2010 1 0104042

(51) Int. Cl.
*B23H 11/00*   (2006.01)
*C25F 7/00*    (2006.01)
*B23H 3/10*    (2006.01)
*B23H 7/20*    (2006.01)
*B23H 7/36*    (2006.01)

(52) U.S. Cl.
CPC .. *B23H 7/36* (2013.01); *B23H 3/10* (2013.01); *B23H 7/20* (2013.01)
USPC .............. 204/297.01; 204/224 M; 204/286.1; 205/686

(58) Field of Classification Search
USPC .......... 205/640–686; 204/222–224 M, 286.1, 204/297.01
See application file for complete search history.

(56) References Cited

U.S. PATENT DOCUMENTS 3,268,434 A * 8/1966 Weingartner ............ 204/224 M
(Continued)

FOREIGN PATENT DOCUMENTS

CN           1287515 A        3/2001
(Continued)

OTHER PUBLICATIONS

International Search Report and Written Opinion dated Apr. 20, 2011 which was issued in connection with the the PCT Application No. PCT/2011/021833 which was filed on Jan. 22, 2011.
(Continued)

*Primary Examiner* — Brian W Cohen
*Assistant Examiner* — James Lin
(74) *Attorney, Agent, or Firm* — GE Global Patent Operation (57) ABSTRACT

A machining system is provided and includes a machining tool comprising a spindle, one or more electrodes configured to perform the electromachining, and one or more tool holding elements configure to conductively hold the respective one or more electrodes and be assembled onto the spindle of the machining tool. The machining system further comprises one or more adapters and one or more power sources configured to electrically connect to the respective one or more adapters and the workpiece. The one or more adapters are configured to conductively contact the respective one or more tool holding elements. Further, the machining system comprises one or more machining solution sources provided to pass one or more machining solutions between the workpiece and the respective one or more electrodes. A tool adapter assembly is also presented.

8 Claims, 8 Drawing Sheets

(56) References Cited

U.S. PATENT DOCUMENTS

| | | | |
|---|---|---|---|
| 4,557,643 A | 12/1985 | Cioci | |
| 4,648,759 A | 3/1987 | Ebenhoch | |
| 4,739,145 A | 4/1988 | Check et al. | |
| 5,197,231 A | 3/1993 | Pedersen et al. | |
| 5,416,289 A * | 5/1995 | Tanaka | 219/69.14 |
| 6,353,199 B1 | 3/2002 | Hosaka et al. | |
| 6,538,227 B1 | 3/2003 | Sano et al. | |
| 2005/0247569 A1* | 11/2005 | Lamphere et al. | 205/663 |
| 2008/0135418 A1* | 6/2008 | Yuan | 205/686 |

FOREIGN PATENT DOCUMENTS

| | | |
|---|---|---|
| CN | 1287516 A | 3/2001 |
| CN | 2925718 Y | 7/2007 |
| CN | 101200011 A | 6/2008 |
| EP | 904892 | 3/1999 |
| EP | 1932611 A2 | 6/2008 |
| JP | 54024379 A | 2/1979 |
| JP | 61100318 A | 5/1986 |

OTHER PUBLICATIONS

CN Office Action dated Oct. 9, 2012 from corresponding CN Application No. 201010104042.1.

* cited by examiner

TOOL ADAPTER ASSEMBLY AND MACHINING SYSTEM

CROSS REFERENCE TO RELATED APPLICATIONS

This is a national stage application under 35 U.S.C. §371 (c) of prior-filed, co-pending PCT patent application serial number PCT/US2011/021833, filed on Jan. 20, 2011, which claims priority to Chinese Patent Application Serial No. 201010104042.1, filed on Jan. 22, 2010, the entire contents of which are incorporated herein by reference.

BACKGROUND OF THE INVENTION

Embodiments of the present invention relate generally to tool adapter assemblies and machining systems employing the tool adapter assemblies. More particularly, embodiments of the present invention relate to tool adapter assemblies and machining systems employing the tool adapter assemblies for electromachining.

Machining systems, such as computer numerical controlled (CNC) machines (or "machining centers") are widely used for machining workpieces. Due to noncontact machining, higher efficiency and lower cutting tool cost, electromachining capacities are being embedded into the machining systems for machining workpieces, such as workpieces having higher hardness.

Electromachining, such as electro discharge machining (EDM), electrochemical machining (ECM) or electrochemical discharging machining (ECDM) is a process in which a cathodic electrode is positioned atop an electrically conductive workpiece, and a machining solution is channeled therebetween. Electrical current passes between the electrode and the workpiece, and locally removes the workpiece for forming desired features thereon.

However, in current applications, it is difficult to embed machining systems with the electromachining capabilities, it is time-consuming for preparation of such electromachining and inefficient to exchange cutting tools with different machining capabilities.

Therefore, there is a need for a new and improved tool adapter assembly and machining system employing the tool adapter assembly for electromachining.

BRIEF DESCRIPTION OF THE INVENTION

A machining system for electromachining of a workpiece is provided in accordance with one embodiment of the invention. The machining system comprises a machining tool comprising a spindle, one or more electrodes configured to perform the electromachining, and one or more tool holding elements configure to conductively hold the respective one or more electrodes and be assembled onto the spindle of the machining tool. The machining system further comprises one or more adapters, and one or more power sources configured to electrically connect to the respective one or more adapters and the workpiece so as to energize the workpiece and the respective one or more electrodes to opposite electrical polarities. The one or more adapter is configured to conductively contact the respective one or more tool holding elements. Further, the machining system comprises one or more machining solution sources provided to pass one or more machining solutions between the workpiece and the respective one or more electrodes.

A tool adapter assembly is provided in accordance with another embodiment of the invention. The tool adapter assembly comprises a tool holding element configured to conductively hold an electrode for electromachining of a workpiece, and comprising a holding head configured to be assembled onto a machining tool and a holding body connected to the holding head and configured to hold the electrode. The tool adapter assembly further comprises one or more adapters configured for electrical connection to a power source and the tool holding element so as to provide an electrical connection between the power source and the electrode.

BRIEF DESCRIPTION OF THE DRAWINGS

The above and other aspects, features, and advantages of the present disclosure will become more apparent in light of the subsequent detailed description when taken in conjunction with the accompanying drawings in which.

DETAILED DESCRIPTION OF THE EXEMPLARY EMBODIMENTS OF THE INVENTION

Embodiments of the present disclosure are described herein with reference to the accompanying drawings. In the subsequent description, well-known functions or constructions are not described in detail to avoid obscuring the disclosure in unnecessary detail.

Figure 1:
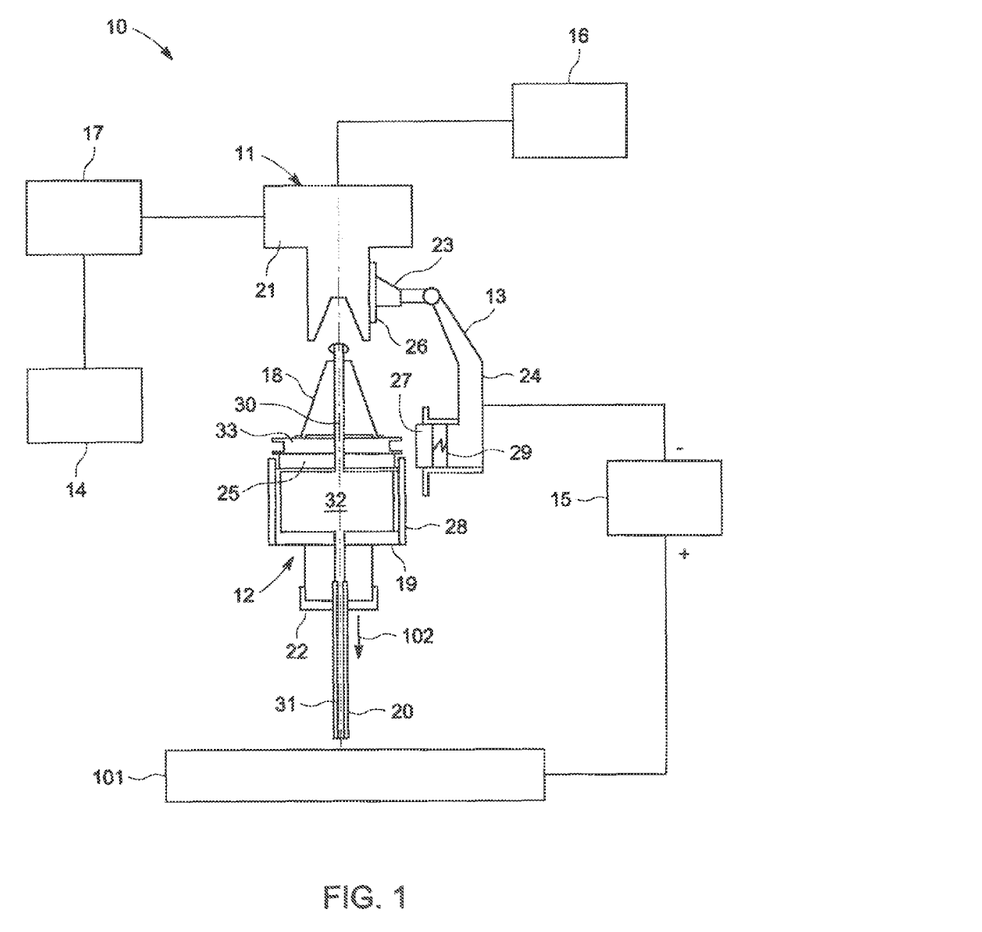
FIGS. 1-4 are schematic diagrams of a machining system in accordance with various embodiments of the invention.

FIG. 1 illustrates a schematic diagram of a machining system 10 for machining a workpiece 101 in accordance with one embodiment of the invention. In non-limiting examples, the machining system 10 may comprise a computer numerical controlled (CNC) machine (or "machining center") and may automatically machine the workpiece 101 according to preset control programs therein with one or more cutting tools, which may be carried in a tool storage or magazine of the machining system. In certain applications, the tool storage or magazine may not be employed.

As illustrated in FIG. 1, the machining system 10 comprises a machine tool 11, a tool adapter assembly (not labeled) comprising an adapter 13 and a tool holding element 12 holding a cutting tool 20, a tool delivery apparatus 14, a power source 15, a machining solution source 16, and a controller 17. It should be noted that the arrangement in FIG. 1 is merely illustrative. The same numerals in FIGS. 1-7 may indicate similar elements. For some arrangements, one or more power sources, one or more tool adapter assemblies, one or more tool delivery apparatuses, one or more machining solution sources, and/or one or more controllers may be employed.

For the arrangements of the invention, the tool holding element 12 is disposed on the machine tool 11 for performing desired machining for the workpiece 101. The machining tool 11 may perform certain operations, such as movement operations. In one non-limiting example, the cutting tool 20 comprises an electrode configured to perform electromachining.

As used herein, in some applications, the term "electromachining" may indicate electro discharge machining (EDM), electrochemical machining (ECM), electrochemical discharging machining (ECDM), electro arc machining (ECAM) or electroerosion machining. In one example, the tool holding element 12 performs ECDM.

In the illustrated example, the tool holding element 12 comprises a holding head 18 and a holding body 19 connected to the holding head 18 with an upper end thereof The machine tool 11 comprises a spindle 21 defining a fitting recess (not labeled) for securely accommodating at least a portion of the holding head 18, so that the tool holding element 12 is assembled onto the machine tool 11 fixedly via cooperation of the holding head 18 and the spindle 21. Thus, the tool holding element 12 moves with the movement of the spindle 21. In one example, the tool holding element 12 rotates with the rotation of the spindle 21.

The electrode 20 is disposed at a lower end of the holding body 19. Additionally, a collet 22 is provided to hold the electrode 20 onto the holding body 19. In certain applications, other suitable holding elements may be employed to hold the electrode 20 onto the holding body 19 fixedly.

For some arrangements, the adapter 13 and the workpiece 101 may be electrically connected to the power source 15. In some non-limiting examples, the adapter 13 and the workpiece 101 may be electrically connected to negative and positive terminals of the power source 15, respectively.

In the example illustrated in FIG. 1, the adapter 13 comprises a base 23 fixedly and detachably assembled onto the spindle 21, and an arm 24 with one end pivotally connected to the base 23 and configured to electrically contact the holding body 19. In some non-limiting examples, the adapter 23 may not be assembled onto the spindle 21. Each of the arm 24, the holding body 19 and the electrode 20 may comprise one or more electrically conductive materials and be connected in turn, so that an electrical current from the power source 15 may pass through the arm 24 and the holding body 19 to reach the electrode 20 for electromachining.

Thus, in non-limiting examples, the electrode 20 may function as a cathode and the workpiece 101 may act as an anode during operation. Non-limiting examples of the one or more electrically conductive materials include metal, metal alloys or other suitable materials.

In certain applications, the base 23 and the holding head 18 may also be electrically conductive. As illustrated in FIG. 1, electrically insulating elements 25, 26 may be provided between the holding head 18 and the holding body 19, and between the spindle 21 and the base 23 respectively for electrical insulation. Each of the elements 25, 26 may comprise one or more electrically insulating materials. Non-limiting examples of the one or more of the electrically insulating materials including polyethylene, ceramics, rubbers materials or other suitable materials.

In other applications, the base 23 and/or the holding head 18 may comprise one or more electrically insulating materials. Thus, the element 25 and/or 26 may not be employed. In some examples, the arm 24 may be actuated using a pneumatic driving mechanism (not shown) to pivot relative to the base 23 to conductively contact and detach from the holding body 19. Alternatively, other suitable driving mechanisms including, without limitation, convex mechanisms may be employed to drive the arm 24 to move toward and away from the holding body 19.

Thus, in some examples, the arm 24 and the holding body 19 may be electrically connected so as to conduct an electrical current therebetween. Similarly, the holding body 19 may conductively hold (electrically connect) the cutting tool 20, so that an electrical current may be conducted therebetween.

In some examples, in order to reinforce the electrical conduction from the arm 24 to the holding body 19, one or more electrically conductive elements may be provided between the arm and the holding body. For the arrangement illustrated in FIG. 1, one or more first electrically conductive elements 27 are disposed at another end opposite to the one end of the arm 24, which is connected to the base 23, to transfer the electrical power from the arm 24 to the holding body 19. In one non-limiting example, an electrical wire (not shown) may be provided to electrically connect the first conductive element 27 and the arm 24 to improve the electrical conduction between the arm 24 and the first conductive element 27 since the electrical resistance of the electrical wire may be lower than that of the arm 24. In non-limiting examples, the one or more first electrically conductive elements 27 may comprise one or more carbon brushes.

In certain applications, as depicted in FIG. 1, one or more second electrically conductive elements 28 may also be employed. The one or more second electrically conductive elements 28 are disposed on the holding body 19 to reinforce the electrical conduction between the holding body 19 and the one or more first conductive elements 27. In one example, the one or more second conductive elements 28 comprise one or more copper elements. In other applications, the first and second conductive elements 27, 28 may not be employed.

Thus, during operation, the electrical power from the power source 15 passes through the arm 24, the first and second conductive elements 27, 28, and the holding body 19 so as to reach the electrode 20. In certain application, one or more springs 29 may also be disposed on the arm 24 to urge the one or more first conductive elements 27 to ensure a certain pressure between the one or more first conductive elements 27 and the respective one or more second conductive elements 28 and/or the holding body 19.

In some examples, the machining solution source 16 is configured to provide one or more machining solutions passing between the electrode 20 and the workpiece 101 during the electromachining. In non-limiting examples, the machining solution(s) may include one or more dielectric solutions or one or more electrolytes. In one example, the machining solution(s) comprise one or more electrolytes.

Similar to some current machining systems, in the example illustrated in FIG. 1, the machining solution source 16 is in fluid communication with the spindle 21. The tool holding element 12 is assembled onto the spindle 21 and defines a first passage 30 passing through the holding head 18 and the holding body 19. The electrode 20 defines an internal channel 31 in fluid communication with the first passage 30. As a result, the machining solution from the machining solution source 16 may pass through the first passage 30 and the internal channel 31 so as to flow between the electrode 20 and the workpiece 101, which may be referred to as internal flushing, as indicated by the arrow 102.

As mentioned above, in some applications, the tool holding element 12 may rotate with the rotation of the spindle 21, and the arm 24 contacts the holding body 19 to deliver the electrical power. Accordingly, in some examples, due to the friction between the rotary holding body 19 and the arm 24 during operation, as illustrated in FIG. 1, the holding body 19 may further define a first chamber 32 therein configured to accommodate the machining solution from an upper portion of the first passage 30, so as to cool the holding body 19. Then, the machining solution from the first chamber 31 is distributed into a lower portion of the first passage 30 to enter into the internal channel 31 of the electrode 20 for the internal flushing.

For some arrangements, one or more controllers may be configured to control the electromachining operation, such as the movement of some components according to preset control programs. In the example illustrated in FIG. 1, the controller 17 controls at least the operation of the machine tool 11. Alternatively, the adapter 13, the tool delivery apparatus 14, the power source 15 and/or the machining solution source 16 may also be controlled by the controller 17 or may have separate controllers.

In certain applications, each of the one or more controllers may comprise at least one of a computer, a database, and/or a processor. It should be noted that the present invention is not limited to any particular computer, database or processor for performing the processing tasks of the invention. The term "computer", as that term is used herein, is intended to denote any machine capable of performing the calculations, or computations, necessary to perform the tasks of the invention. The term "computer" is intended to denote any machine that is capable of accepting a structured input and of processing the input in accordance with prescribed rules to produce an output. It should also be noted that the phrase "configured to" as used herein means that the computer is equipped with a combination of hardware and software for performing the tasks of the invention.

In the example illustrated in FIG. 1, the tool delivery apparatus 14 is configured to automatically deliver one or more cutting tools between one or more tool delivery apparatuses and the machine tool according to certain control programs, for example using a controller. In other examples, the tool delivery apparatus may not be employed.

Similar to some current machining systems, in some non-limiting examples, the tool delivery apparatus may comprise a tool magazine and/or a tool exchange apparatus (not shown). The tool magazine is configured to store one or more cutting tools. The tool exchange apparatus is configured to assemble and detach a desired cutting tool onto and from the machine tool 11, respectively. Non-limiting examples of the tool exchange apparatus include rotating arms, convex mechanisms or other suitable mechanisms, which may be readily implemented by one skilled in the art.

In some applications, the tool exchange apparatus may be assembled onto the tool magazine, so that the tool magazine may assemble and detach the cutting tool onto and from the machine tool automatically as well as store the cutting tools. Alternatively, the tool exchange apparatus may be provided separately from the tool magazine, as will be understood by those skilled in the art.

In other applications, the tool magazine may not be employed. For example, one cutting tool is provided, and the tool exchange apparatus is provided to assemble and detach the one cutting tool onto and from the machining tool, respectively. In other examples, in addition to assembling and detaching the cutting tool, the tool exchange apparatus may function as a tool magazine for storing one or more cutting tools.

Additionally, as depicted in FIG. 1, the tool holding element 12 further comprises a notch element 33, so that the tool delivery apparatus 14 clamps the notch element 33 to deliver the tool holding element 12. In certain applications, the notch element 33 may be unitary with the holding head 18 or may be provided separately from and/or located below the holding head 18.

Accordingly, for some arrangements, during operation, according to certain control programs preset in one or more controllers 17, the tool delivery apparatus 14 holds a desired cutting tool, such as the tool holding element 12 and assembles the tool holding element 12 onto the spindle 21 of the machine tool 11. Subsequently, the adapter 13 is controlled to automatically move to contact the holding body 19 for electrical connection to the power source 15 and the electrode 20. Then, an electric current from the power source 15 passes through the workpiece 101 and the electrode 22 to remove materials from the workpiece 101 to form desired features, while the machining solution from the solution source 16 passes through the first passage 30 and the internal channel 31 to carry the removed materials away.

In certain examples, after the electromachining is completed, the tool delivery apparatus 14 may detach the tool holding element 12 from the spindle 21. In other examples, the tool delivery apparatus 14 holds another cutting tool for assembling onto the spindle 21 while detaching the former tool holding element 12 to perform other machining, such as milling or hybrid machining.

As can be seen, for some arrangements, the tool holding element 12 is automatically assembled onto and/or detached from the spindle 21 so as to improve the machining efficiency. For other arrangements, regardless of whether the tool holding element 12 is automatically or is manually assembled onto the spindle 21, the adapter 13 may automatically contact the holding body 19, so that the electrical connection between the power source 15 and the electrode 20 may be automatically provided, which may enhance the efficiency of the machining.

Figure 2:
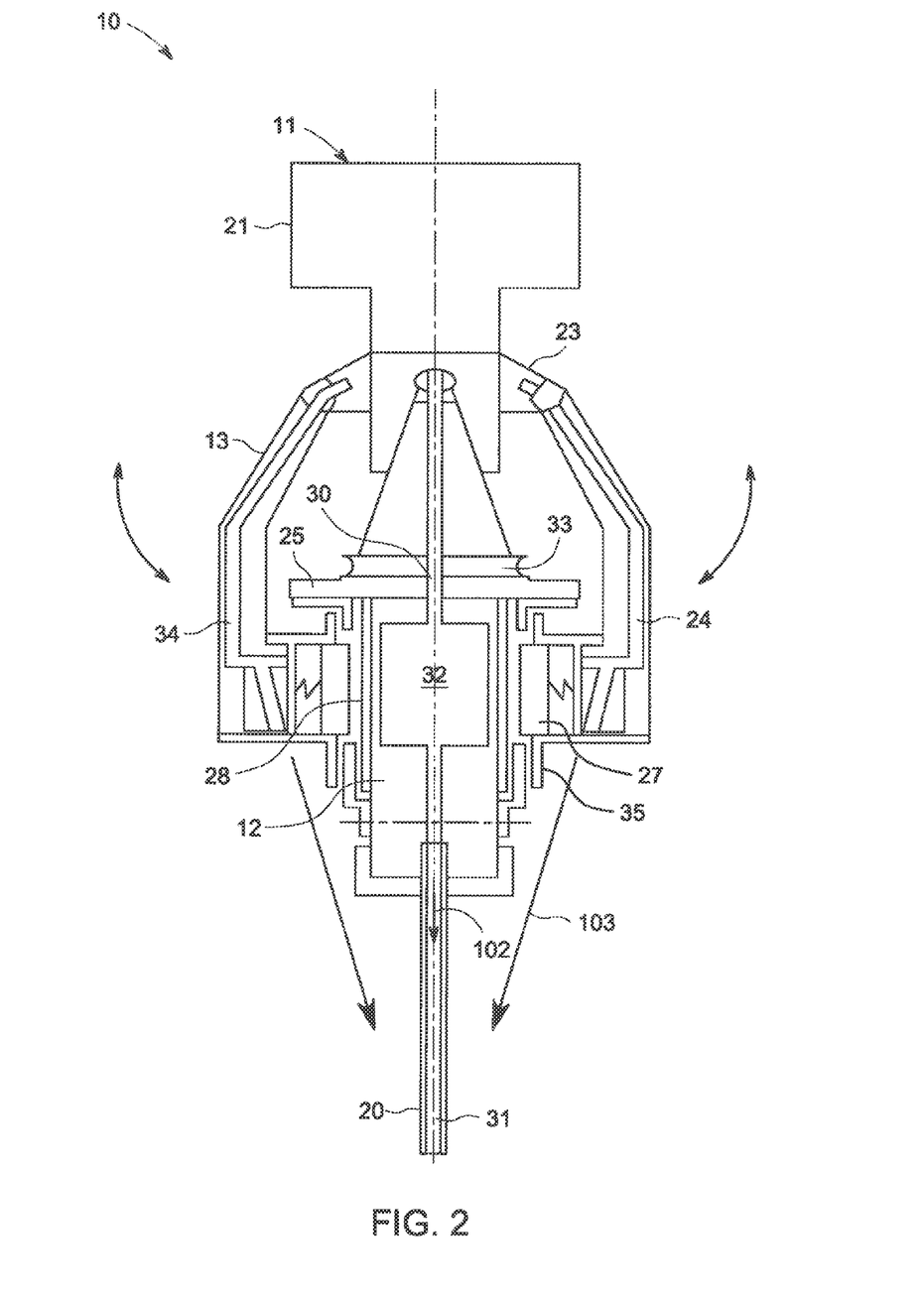

FIG. 2 is a schematic diagram of the machining system 10 in accordance with another embodiment of the invention. It should be noted the arrangements illustrated in FIGS. 2-8 are merely illustrative. For ease of illustration, the one or more tool delivery apparatus, the one or more power sources, the one or more machining solution sources and the one or more controllers are not illustrated in the arrangements in FIGS. 2-8.

As illustrated in FIG. 2, the arrangement is similar to the arrangement in FIG. 1. The two arrangements in FIGS. 1-2 differ in that the tool adapter assembly in FIG. 2 comprises multiple adapters 13 assembled onto the spindle 21. Each of the adapters 13 comprises a base 23 and an arm 24 pivotally connected to the base 23, and defines one or more passages 34 at least passing through the arm 24 along the contour thereof and in fluid communication with the machining solution source 16 (shown in FIG. 1). In certain applications, one adapter may be employed.

Thus, in addition to a first passage 30 defined within the tool holding element 12 and an internal channel 31 defined within the electrode 20 for the internal flushing, in some examples, the machining solution from the machining solution source 16 may pass through the respective one or more passages 34 in the respective one or more adapters 13 so as to project between the electrode 20 and the workpiece 101 from an outside of the electrode 20, which may be referred to as external flushing, as indicated by the arrow 103, since the machining solution is delivered between the electrode 20 and the workpiece 101 from a periphery of the electrode 20 instead of through the internal channel 31 in the electrode 20.

Additionally, one or more sealing elements 35, such as rubber rings may be disposed around the adapters 13 and the tool holding element 12 for sealing to avoid leaks and dispersion of the machining solution. Similarly, one or more first and second electrically conductive elements 27, 28 may also be provided so as to facilitate forming the electrical connection between the electrode 20 and the power source 15.

Accordingly, similar to the arrangement in FIG. 1, in operation, after the tool holding element 12 carrying the electrode 20 is assembled onto the spindle 21, the one or more adapters 13 are controlled to automatically move to contact the respective one or more second conductive elements 28 to form the electrical connection between the electrode 20 and the power source 15 for the electromachining. In the meantime, the machining solution passes through the one or more passages 34 within the one or more adapters 13 for the external flushing while passing through the first passage 30 in the tool holding element 12 and the internal channel 31 in the electrode 20 for the internal flushing.

After the electromachining, the one or more adapters 13 release the tool holding element 12, and the tool holding element 12 carrying the electrode 20 may be detached from the spindle 21 and stored, for example in a tool magazine. In certain applications, another cutting tool (not shown) may be selected and assembled on the spindle 21 for a next machining while detaching the former tool holding element 12 carrying the electrode 20.

Figure 3:
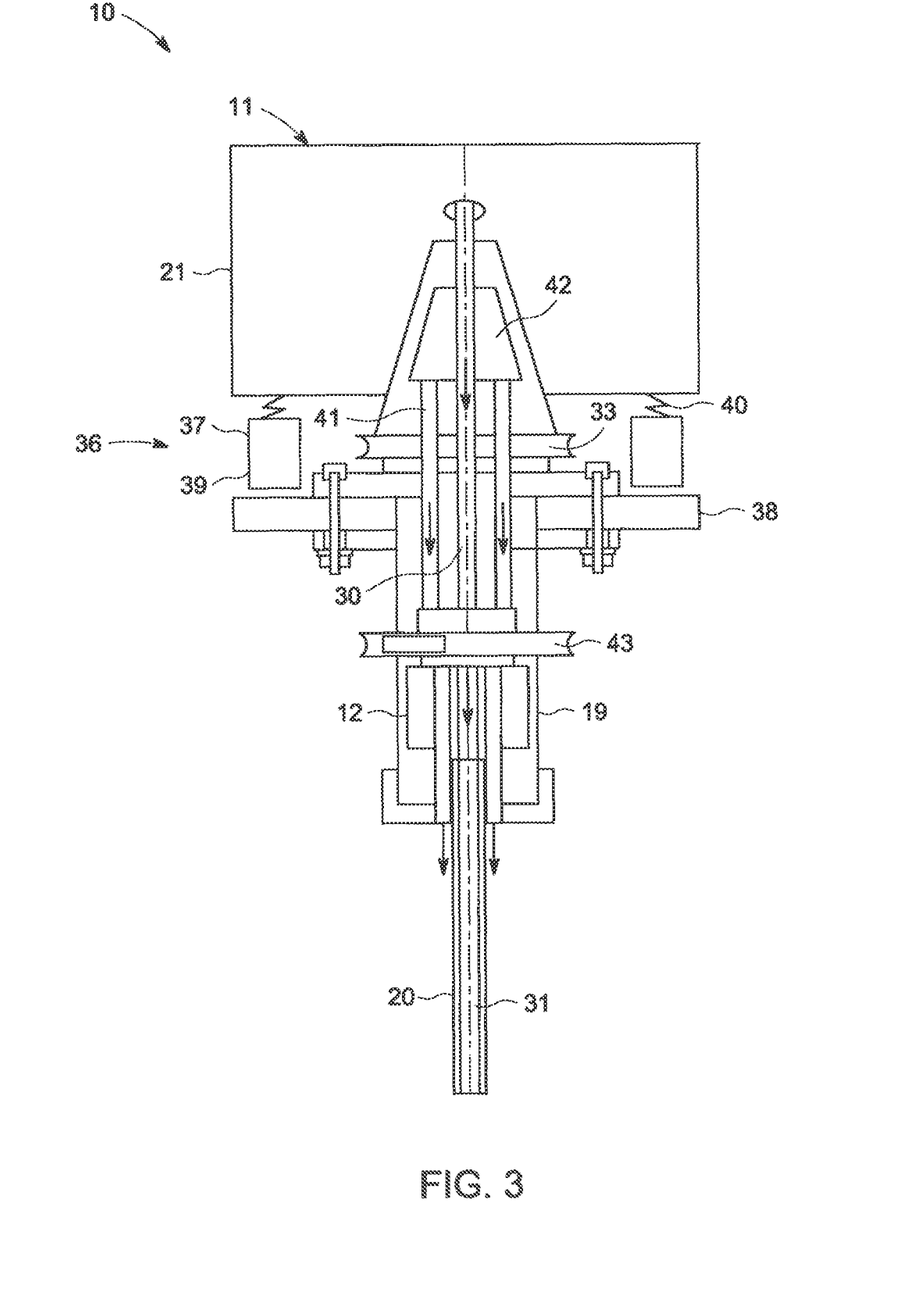

As illustrated in FIG. 3, the arrangement is similar to the arrangement shown in FIG. 1. The two arrangements shown in FIGS. 1 and 3 differ in that an adapter 36 in FIG. 3 comprises a pair of bases 37 and an arm 38. The bases 37 are dielectrically assembled onto the spindle 21 of the machine tool 11 and connected to the power source 15. The arm 38 is conductively assembled onto the holding body 19. In some applications, the adapter 36 may comprise one or more bases 37 and one or more arms 38.

In some applications, the bases 37 and the arm 38 are electrically conductive, so that when the tool holding element 12 is assembled onto the spindle 21, the bases 37 mate with the arm 38 to form the electrical connection between the power source 15 and the electrode 20.

In the example illustrated in FIG. 3, each of the bases 37 comprise an electrically conductive member 39, and a spring 40 is disposed between the machine tool 11 and the electrically conductive member 39 to urge the electrically conductive member 39 under a certain pressure to contact the arm(s) 38. In one example, the electrically conductive member 39 comprises a carbon brush. The arm 38 has a toroidal shape and is disposed around the holding body 19. In other applications, the arm 38 may have other shapes, such as a rectangular shape.

For the arrangement illustrated in FIG. 3, in addition to the first passage 30 defined within the tool holding element 12 and the internal channel 31 defined within the electrode 20, the tool holding element 12 further defines one or more second passages 41 disposed besides the first passage 30 to be in fluid communication with the machining solution source 16, so that the machining solution passes through the one or more second passages 41 defined within the tool holding element 12 to flow between the electrode 20 and the workpiece 101 from a periphery of the electrode 20 to perform the external flushing.

Additionally, the tool holding element 12 further defines a second chamber 42 within the holding head 18 to distribute the machining solution into the first and second passages 30, 41, and a second notch element 43 disposed on the holding body 19 for clamping of the tool delivery apparatus 14. In some applications, the first and second chambers 32, 42 may not be employed. A first notch element 33 may not be employed for certain arrangements.

Accordingly, in operation, after the tool holding element 12 is assembled onto the spindle 21, the electrically conductive bases 37 contact the electrically conductive arm 38 so as to form the electrical connection between the electrode 20 and the power source 15. The machining solution from the solution source 16 enters into the second chamber 42 for distribution. Then, a portion of the machining solution passes through the first passage 30 and the internal channel 31 for the internal flushing. Simultaneously, another portion of the machining solution passes through the one or more second passages 41 to flow outside the electrode for the external flushing.

Figure 4:
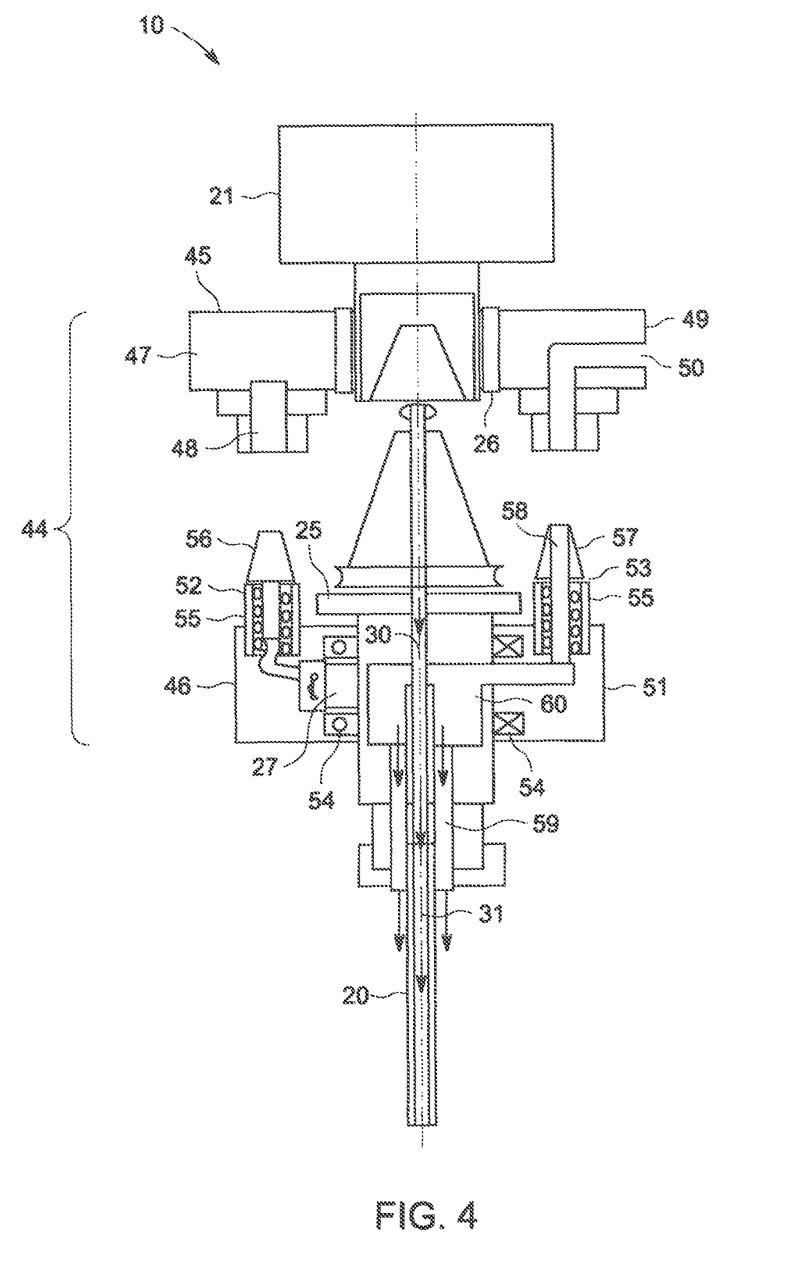

FIG. 4 is a schematic diagram of the machining system 10 in accordance with yet another embodiment of the invention. As illustrated in FIG. 4, an adapter 44 comprises a base 45 and an arm 46 configured to mate with the base 45 so as to provide the electrical connection and/or the machining solution connection.

The base 45 is assembled onto the spindle 21 and comprises a first connection element (not labeled). The first connection element comprises an electrical element 47 defining a fitting recess 48 and electrically connected to the power source 15, and a fluid communication element 49 defining a fitting passage 50 to be in fluid communication with the machining solution source 16 (shown in FIG. 1). In some applications, the electrical element 47 and the fluid communication element 49 may be unitary or may be provided separately from each other.

The arm 46 comprises a supporting element 51 assembled onto the holding body 19 and a second connection element (not labeled). The second connection element comprises an electrical connection element 52 and a fluid connection element 53 disposed on the supporting element 51 to mate with the respective electrical element 47 and the fluid communication element 49 of the first connection element. One or more bearings 54 are provided between the arm 46 and the holding body 19 for facilitating rotation of the tool holding element 12 relative to the arm 46.

In some examples, the electrical connection element 52 and/or the fluid connection element 53 may be unitary with or provided separately from the supporting element 51. In certain applications, the electrical connection element 52 and the fluid connection element 53 may be spaced separately from each other or be disposed on the same one element.

In the illustrated example in FIG. 4, each of the electrical connection element 52 and the fluid connection element 53 comprises a connection portion 55 protruding from an upper surface of the supporting element 51 so as to assure accurate mating with the respective electrical element 47 and the fluid communication element 48. A first element 56 and a second element 57 are moveably held in and extend beyond the respective connection portions 55. The second element 57 defines a connection passage 58 to be in fluid communication with the fitting passage 50 in the fluid communication element 49. A pair of springs (not labeled) are also disposed within the connection portions 55, so as to enhance the connection between the electrical element 47 and the first element 56, and between the connection passage 58 and the fitting passage 50. In certain applications, the first and second elements 56, 57 may not be employed. The connection portions 55 may be directly connected to the respective electrical element 47 and the fluid communication element 49.

Similarly, in addition to the first passage 30 defined within the tool holding element 12 and the internal channel 31 defined within the electrode 20 for the internal flushing, the holding body 19 further defines one or more passages 59 beside the first passage 30 to be in fluid communication with the fitting passage 50, and a first chamber 60 for distributing the machining solution into the one or more passages 59 and/or cooling the holding body 19.

Thus, during operation, after the tool holding element 12 is assembled onto the spindle 21, the electrical current passes through the electrical element 47, the electrical connection element 52, the supporting element 51 and the holding body 19 to reach the electrode 20, so as to provide the electrical connection between the electrode 20 and the power source 15 (shown in FIG. 1). Meanwhile, the fluid connection element 53 mates with the fluid communication element 49 to form a solution connection, so that the machining solution passes through the fitting passage 50, the connection passage 58, the first chamber 60 and the passage(s) 59 to flow outside of the electrode 20 for the external flushing.

Similar to the arrangement in FIG. 1, one or more of the first and second conductive elements may be also provided between the supporting element 51 and the holding body 19 to reinforce the electrical conduction. In non-limiting examples, one or more electrical wires (not shown) may also be provided to electrically connect the one or more first conductive elements and the supporting element 51 or the electrical connection element 52 to improve the electrical conduction. Alternatively, the one or more of the first and second conductive elements may not be employed.

For the arrangement illustrated in FIG. 4, the tool holding element 12 defines the one or more passages 59 therein to perform the external flushing. In some examples, other arrangements may also be provided for the external flushing.

Figure 5:
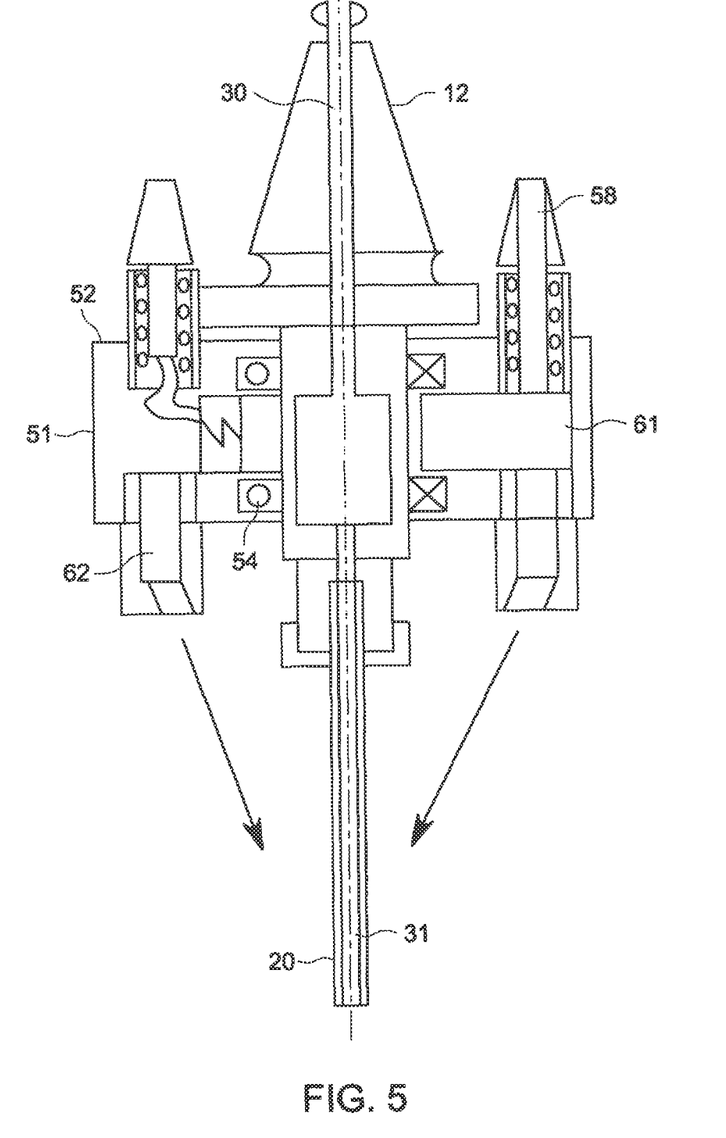
FIG. 5 is a schematic diagram of a tool adapter assembly holding an electrode of the machining system in accordance with one embodiment of the invention.

FIG. 5 is a schematic diagram of a tool adapter assembly including the tool holding element 12 and the adapter 44 in accordance with one embodiment of the invention. As illustrated in FIG. 5, the arrangement is similar to the arrangement in FIG. 4. The two arrangements shown in FIGS. 4 and 5 differ in that the supporting element 51 in FIG. 5 defines a cavity 61 in fluid communication with the connection passage 58, and one or more projection passages 62 in fluid communication with the cavity 61 for projecting the machining solution from the cavity 61 between the electrode 20 and the workpiece 101.

Figure 6:
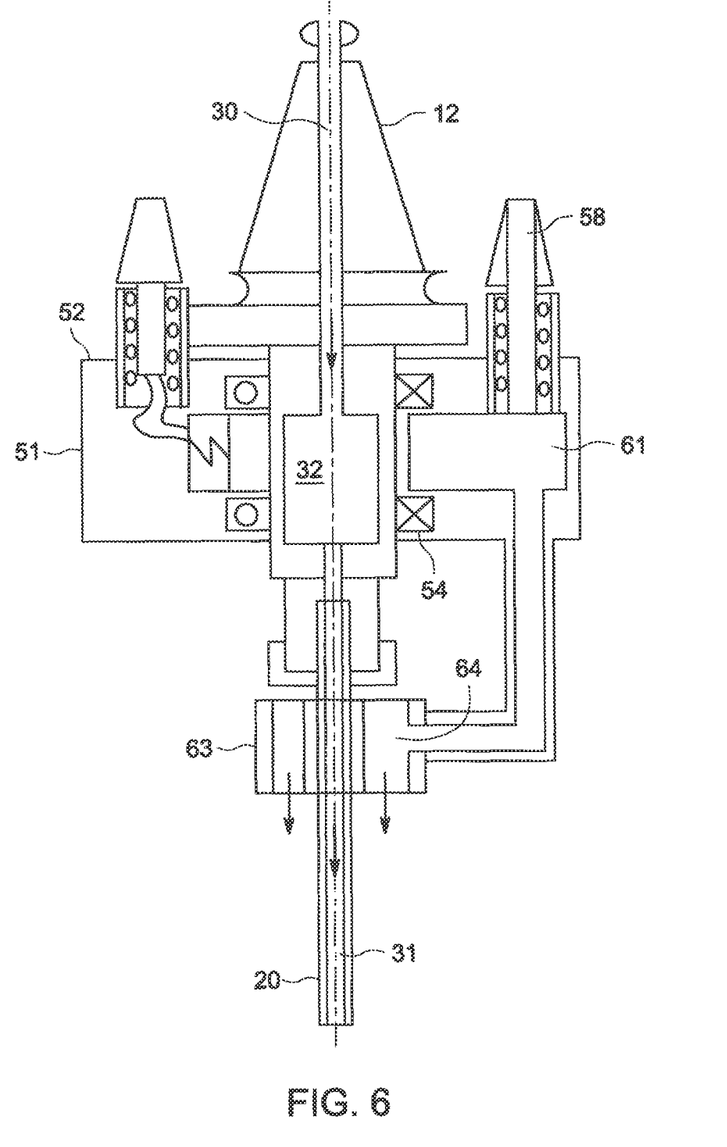
FIG. 6 is a schematic diagram of the tool adapter assembly holding the electrode in accordance with another embodiment of the invention.

As illustrated in FIG. 6, the arrangement is similar to the arrangement in FIG. 5. The two arrangements shown in FIGS. 5 and 6 differ in that a distribution element 63 in FIG. 6 is disposed around the electrode 20. The distribution element 63 defines one or more passageways 64 and in fluid communication with the connection passage(s) 58 in the fluid connection element 53.

Thus, in operation, the machining solution from the fitting passage 50 (shown in FIG. 4) passes through the one or more passageways 64 in the distribution element 63 so as to flow outside of the electrode 20 for the external flushing.

For the arrangements in FIGS. 5 and 6, in certain examples, the supporting element 51 may not define the cavity 61. The one or more projection passages 62 in FIG. 5 may be defined within the supporting element 51. Similarly, one or more of the first and second conductive elements may be also provided between the supporting element 51 and the holding body 19 to reinforce the electrical conduction.

Figure 7:
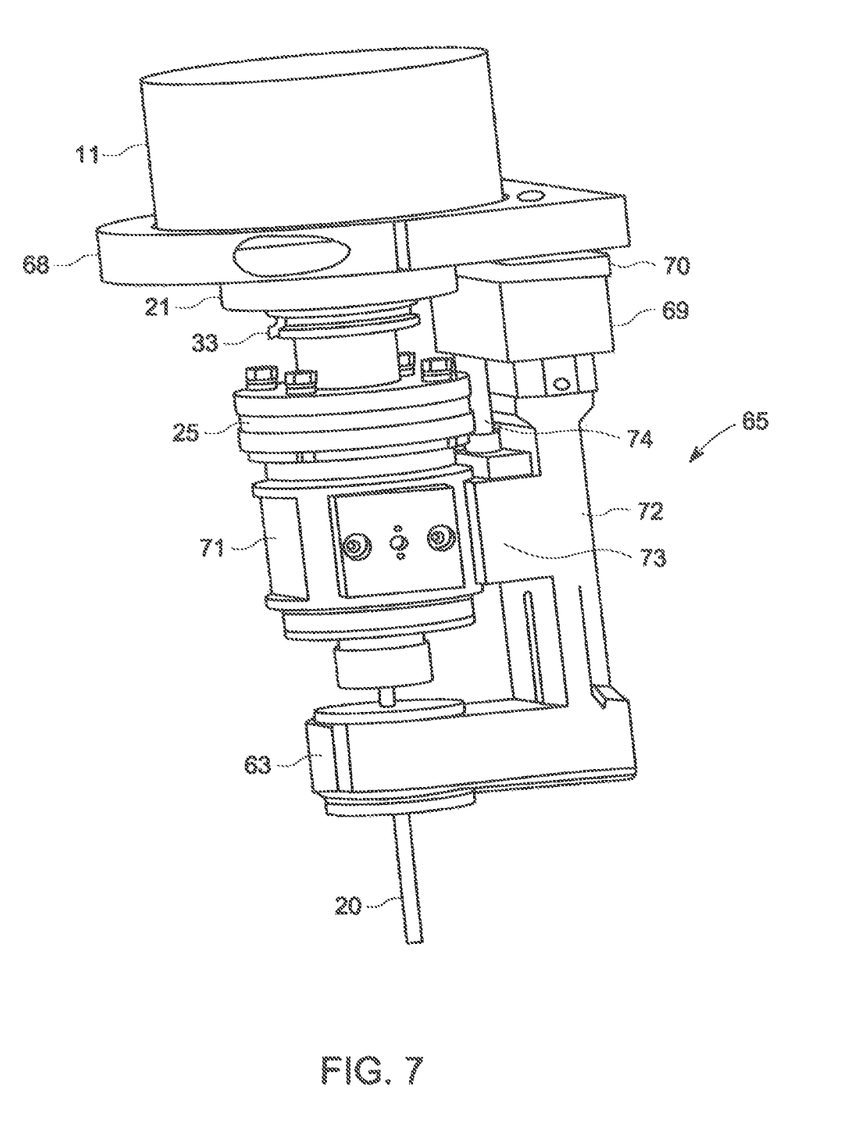
FIG. 7 is a perspective view of the tool adapter assembly holding the electrode in accordance with one embodiment of the invention.
Figure 8:
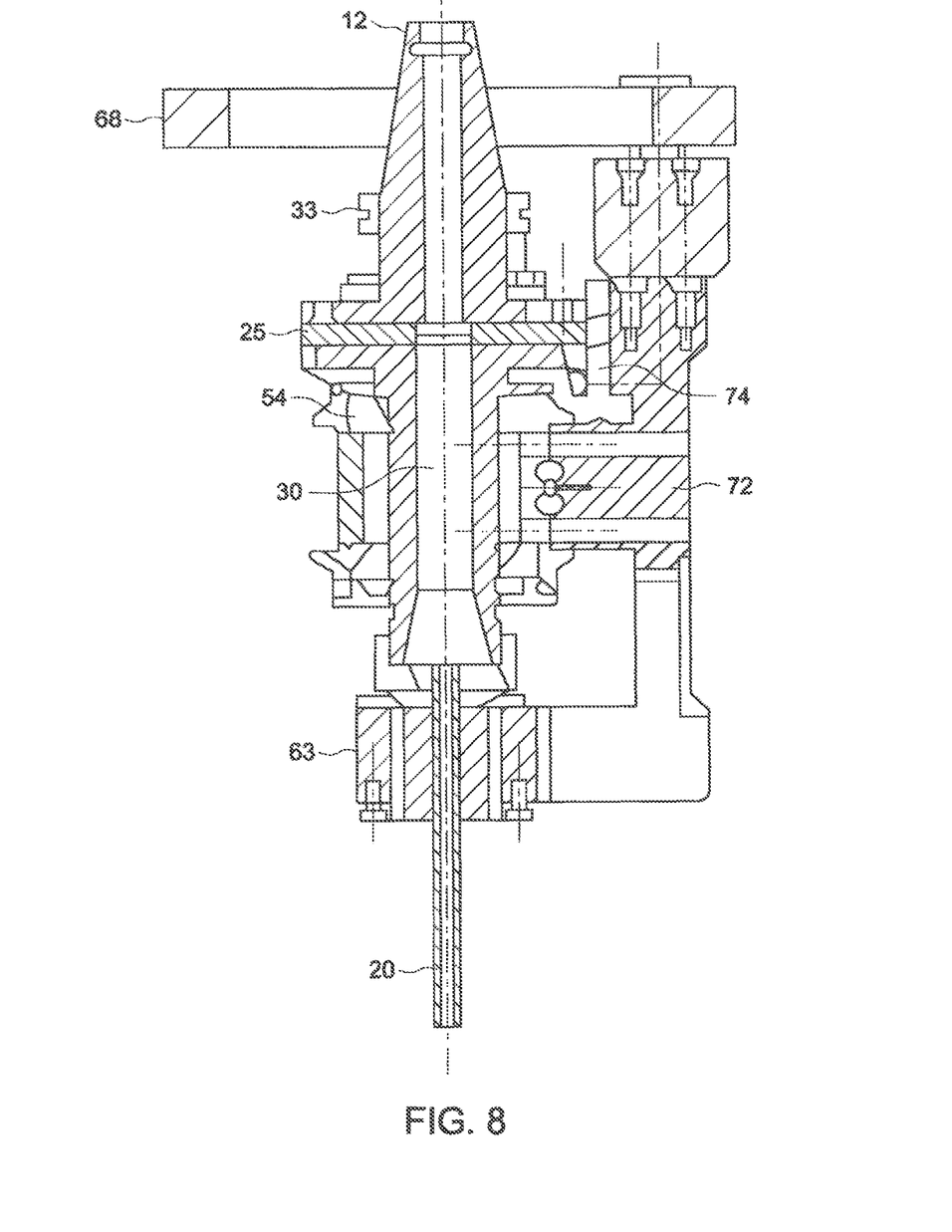
FIG. 8 is a cross sectional view of the tool adapter assembly shown in FIG. 7.

FIGS. 7 and 8 illustrate a perspective view and a cross sectional view of the tool adapter assembly of the tool holding element 12 and an adapter 65 in accordance with one embodiment of the invention. As illustrated in FIGS. 7 and 8, the configuration of the tool holding element is similar to the configurations of the tool holding element shown in FIGS. 5 and 6.

The adapter 65 comprises a base 66 and an arm 67. The base 66 comprises a toroidal holding member 68 disposed around the spindle 21, and a first connection element 69 disposed on the holding member 68 to be conductively connected to the power source 15, and defining one or more first channels (not shown) to be in fluid connection with the machining solution source 16. In the illustrated example, the holding member 68 and the first connection element 69 are provided separately from each other. Alternatively, the holding member 68 and the first connection element 69 may be unitary.

For the illustrated arrangement, the first connection element 69 is electrically conductive to facilitate forming electrical connection between the electrode 20 and the power source 15. Similar to the arrangement in FIG. 1, for electrical insulation, one or more electrically insulating elements 70 may be disposed between the holding member 68 and the first connection element 69, and/or between the holding member 68 and the spindle 21.

The arm 67 comprises a supporting element 71 disposed around the holding body 19 and a second connection element 72 mechanically and electrically connected to the supporting element 71. Similar to the arrangement in FIGS. 4-6, one or more bearings 54 (shown in FIG. 8) are provided between the supporting element 71 and holding body 19 to facilitate rotating of the tool holding element 12 relative to the adapter 65. Similarly, in certain applications, one or more first conductive elements, such as carbon brushes, may also be disposed between the supporting element 71 and the holding body 19 for facilitating formation of the electrical connection. In other examples, one or more second conductive elements, such as copper elements may also or may not be disposed on the holding body 19 to electrically mate with the one or more first conductive elements.

For the arrangement in FIG. 7, the second connection element 72 is configured to mate with the first connection element 69 with one end thereof. In some examples, for easy mating of the first and second connection elements 69, 72, a plurality of springs (not shown) may be disposed in the first and/or connection parts 69, 72. Additionally, one or more electrically conductive materials (not shown), such as copper materials may also be provided on the first and/or second connection elements 69, 72 to reinforce the electrical connection therebetween.

As depicted in FIG. 7, the second connection element 72 defines one or more second channels (not shown) and comprises a protruding portion 73. The one or more second channels are configured to be in fluid communication with the respective one or more first channels within the first connection element 69. In some non-limiting examples, the one or more second channels may protrude from the end of the second connection element 72 cooperating with the first connection element 69 so as to insert into the respective one or more first channels, which may assure accurate mating between the first and second connection elements 69, 72. Alternatively, other suitable configurations may be employed on the first or second connection element for accurate mating of the first and second connection elements. For example, without limitation, one of the first and second connection elements is formed with one or more protruding pins to cooperate with respective one or more recesses defined on the other.

For the arrangement depicted in FIG. 7, the protruding portion 73 protrudes horizontally at an approximately middle portion of the second connection element 72 to connect the supporting element 71 so as to assemble the second connection element 72 onto the tool holding element 12. Additionally, similar to the arrangement in FIG. 6, a distribution element 63 is provided around the electrode 20 and in fluid communication with the one or more second channels within the second connection element 72.

Thus, during operation, the first connection element 69 is mated with the second connection element 72, so that the machining solution from the machining solution source 16 passes through the one or more first channels, the one or more second channels and the distribution element 63 for the external flushing. Since the first and second connection elements 69, 72 are electrically conductive, the electrical current passes through the first and second connection elements 69, 72 to reach the electrode 20 so as to form the electrical connection between the power source 15 and the electrode 20.

Similarly, after operation, the tool holding element 12 may be detached from the spindle 21, so that the first connection element 69 is detached from the second connect part 72. In the illustrated example, the second connection element 72 is separated from the distribution element 63. Alternatively, the second connection element 72 may be unitary with the distribution element 63. Additionally, one or more of the arrangements in FIGS. 4-6 for the external flushing may also be deployed for the arrangement in FIG. 7.

In some applications, during the assembly of the tool holding element 12 and the second connection element 72 is delivered between the machining tool 11 and the tool delivery apparatus 14, in order to avoid vibration or movement of the tool holding element 12 relative to the second connection element 72, a stop block 74 may be moveably disposed on the second connection element 72 to hold the tool holding element 12 to be stationary relative to the second connection element 72.

In one example, the upper end of the holding body 19 defines one or more slots (not labeled). The stop block 74 comprises an extending portion (not shown) to extend into the one or more slots to lock the holding body 19, so that the tool holding element 12 and the stop block 74 are stationary relative to each other.

Then, the tool holding element 12 is assembled onto the spindle 21, the first connection element 69 collides with and presses down on the stop block 74 while the first and the second connection elements 69, 72 are being mated, so that the extending portion of the stop block 74 slides out of the corresponding slot to release the holding body 19. Accordingly, when machining, the tool holding element 12 carries the electrode 20 to rotate with the rotation of the spindle 21.

For arrangements of the invention, the tool adapter assembly may be automatically assembled onto and detached from the spindle. The electrical connection and the electrolyte connection, such as the external flushing may be accomplished automatically in certain control programs, which is more efficient compared to current machining systems for the electromachining. Additionally, it is relatively easier to use the arrangements of the invention to retrofit current machining systems for electromachining with higher efficiency.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be through the spirit and scope of the disclosure as defined by the subsequent claims.

What is claimed is:

1. A machining system for electromachining of a workpiece, the machining system comprising:
    a machining tool comprising a spindle;
    one or more electrodes configured to perform the electromachining;
    one or more tool holding elements configured to conductively hold the respective one or more electrodes and be assembled onto the spindle of the machining tool;
    one or more adapters comprising one or more bases detachably assembled onto the spindle and an arm having a first end pivotally connected to the one or more bases and a second end opposite to the first end having one or more electrically conductive elements configured to conductively contact the respective one or more tool holding elements;
    one or more power sources electrically connected to the respective one or more adapters and the workpiece so as to energize the workpiece and the respective one or more electrodes to opposite electrical polarities; and
    one or more machining solution sources provided to pass one or more machining solutions between the workpiece and the respective one or more electrodes.

2. The machining system of claim 1, further comprising one or more controllers configured to:
    control the machining tool to carry the one or more tool holding elements holding the respective one or more electrodes to perform the electromachining automatically; and
    control the one or more adapters to conductively contact the respective one or more tool holding elements automatically.

3. The machining system of claim 1, wherein the one or more tool holding elements define one or more first passages in fluid communication with one or more internal channels defined within the respective one or more electrodes such that the one or more machining solutions enter into the first passages and the internal channels through the spindle to internally flush the passages and one or more internal channels.

4. The machining system of claim 3, wherein the one or more machining solutions pass between the workpiece and the respective one or more electrodes from periphery of the one or more electrodes to externally flush the one or more electrodes with the one or more machining solutions, and wherein the one or more tool holding elements define one or more second passages located beside the respective one or more first passages and in fluid communication with the one or more machining solution sources such that the one or more machining solutions passing through the one or more second passages flow between the workpiece and the respective one or more electrodes to provide the external flushing.

5. The machining system of claim 1, wherein the one or more adapters comprises one or more arms configured to cooperate with the respective one or more bases so as to conductively contact the respective one or more tool holding elements.

6. The machining system of claim 5, wherein the one or more arms are assembled onto the respective one or more tool holding elements and configured to electrically mate with the respective one or more bases.

7. The machining system of claim 1, wherein the one or more bases comprise one or more first connection elements configured to electrically connect to the respective one or more power sources and in fluid communication with the respective one or more machining solution sources, and wherein the one or more arms comprise one or more supporting elements disposed on the respective one or more tool holding elements and one or more second connection elements disposed on the respective one or more supporting elements and configured to mate with the respective one or more first connection elements for electrical connection and fluid connection.

8. The machining system of claim 7, further comprising one or more distribution elements disposed around the respective one or more electrodes and defining one or more passageways in fluid communication with the respective one or more second connection elements for the one or more machining solutions passing between the one or more electrodes and the workpiece from the periphery of the respective one or more electrodes via the one or more passageways.

\* \* \* \* \*